(12) United States Patent
Park et al.

(10) Patent No.: US 11,164,390 B2
(45) Date of Patent: Nov. 2, 2021

(54) METHOD AND APPARATUS FOR DISPLAYING VIRTUAL REALITY IMAGE

(71) Applicant: KOREA INSTITUTE OF SCIENCE AND TECHNOLOGY, Seoul (KR)

(72) Inventors: Min Chul Park, Seoul (KR); Ji Hoon Kang, Seoul (KR); Jun Yong Choi, Seoul (KR); Kyul Ko, Seoul (KR); Dae Hwan Ahn, Seoul (KR); Dae Yeon Kim, Seoul (KR); Hyun Woo Ko, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 17/105,883

(22) Filed: Nov. 27, 2020

(65) Prior Publication Data

US 2021/0201585 A1   Jul. 1, 2021

(30) Foreign Application Priority Data

Dec. 30, 2019  (KR) .......................... 10-2019-0177549
Dec. 30, 2019  (KR) .......................... 10-2019-0177550

(51) Int. Cl.
*G06T 19/00* (2011.01)
*G06F 3/01* (2006.01)
(Continued)

(52) U.S. Cl.
CPC ............ *G06T 19/006* (2013.01); *G01P 13/00* (2013.01); *G06F 3/011* (2013.01);
(Continued)

(58) Field of Classification Search
CPC ......... G06T 19/006; G06T 1/20; G06T 15/20; G06T 19/20; G06T 7/70; G06T 19/00;
(Continued)

(56) References Cited

U.S. PATENT DOCUMENTS

2016/0042567 A1*  2/2016  Shuster .................. G06T 19/20
                                                    345/633
2017/0270635 A1*  9/2017  Chun ...................... G06F 3/012
(Continued)

FOREIGN PATENT DOCUMENTS

JP   2017148530 A   8/2017
JP   2018189937 A   11/2018
(Continued)

*Primary Examiner* — Xilin Guo
(74) *Attorney, Agent, or Firm* — Rabin & Berdo, P.C.

(57) ABSTRACT

A user wears a virtual reality mask (VR mask) (100) and then watches a virtual reality image. The VR mask (100) blocks light incident from the outside. When the user wears the VR mask (100), the user cannot discover an obstacle (500) positioned outside the VR mask (100). The user may collide with the obstacle (500) and may be injured by the obstacle (500). Accordingly, in order to prevent injury to the user who uses the VR mask (100), it is necessary to make the user recognize the obstacle (500) positioned outside the VR mask (100). In order to recognize an obstacle, a virtual reality image and the obstacle may be displayed together, or the amount of light incident from the outside may be adjusted.

3 Claims, 9 Drawing Sheets

(51) Int. Cl.
*G06T 1/20* (2006.01)
*G06T 15/20* (2011.01)
*G01P 13/00* (2006.01)
*G06K 9/00* (2006.01)
*G02B 5/30* (2006.01)

(52) U.S. Cl.
CPC ............ *G06K 9/00664* (2013.01); *G06T 1/20* (2013.01); *G06T 15/20* (2013.01); *G02B 5/30* (2013.01)

(58) Field of Classification Search
CPC .......... G01P 13/00; G06F 3/011; G06F 3/017; G06F 3/012; G06F 3/0482; G06K 9/00664; G06K 9/00362; G02B 5/30
See application file for complete search history.

(56) References Cited

U.S. PATENT DOCUMENTS

| | | | |
|---|---|---|---|
| 2017/0358141 A1* | 12/2017 | Stafford | A63F 13/537 |
| 2019/0237044 A1* | 8/2019 | Day | G06F 3/04812 |
| 2020/0013228 A1* | 1/2020 | Lee | G06F 3/012 |
| 2020/0057330 A1* | 2/2020 | Yamazaki | G02F 1/136286 |

FOREIGN PATENT DOCUMENTS

| | | |
|---|---|---|
| KR | 1020170014451 A | 2/2017 |
| KR | 1020190106485 A | 9/2019 |
| KR | 1020190106931 A | 9/2019 |

* cited by examiner

METHOD AND APPARATUS FOR DISPLAYING VIRTUAL REALITY IMAGE

CROSS-REFERENCE TO RELATED APPLICATION

This application claims priority to and the benefit of Korean Patent Application Nos. 2019-0177549 and 2019-0177550, filed on Dec. 30, 2019, the disclosures of which are incorporated herein by reference in its entirety.

BACKGROUND

1. Field of the Invention

The present disclosure relates to a method and apparatus for displaying a virtual reality image, and particularly, to a method of displaying a virtual reality image using a virtual reality mask (VR mask), augmented reality glasses (AR glasses), a VR device, or a head-mounted display (HMD), etc.

2. Discussion of Related Art

Various content items are being produced using virtual reality images. Virtual reality (VR) devices provide users with a virtual environment rather than a real environment so that the users may experience a new environment.

Augmented reality (AR) glasses provide users with a real environment and a virtual image to provide the users with information that cannot be acquired in the real environment.

Recently, technologies for providing both an AR mode and a VR mode using a single device have been developed. However, users have to be able to view a real environment in the AR mode and view the virtual environment in the VR mode. Thus, it is difficult to provide the two modes.

SUMMARY OF THE INVENTION

The present disclosure provides a method of preventing a user from colliding with an obstacle when a user approaches the obstacle while a virtual reality image is being displayed.

According to an aspect of the present invention, there is provided a virtual reality image display method including displaying a virtual reality image to a user, capturing an external image, identifying an obstacle included in the external image, and displaying the virtual reality image and the obstacle together.

In an embodiment, the displaying of the obstacle includes displaying the obstacle as a silhouette.

In an embodiment, the displaying of the obstacle includes displaying the obstacle more sharply as a distance between the obstacle and the user decreases.

According to an aspect of the present invention, there is provided a head-mounted display (HMD) including a display device configured to display a virtual reality image to a user, a camera configured to capture an external image, and a processor configured to identify an obstacle included in the external image, wherein the display device displays the obstacle together with the virtual reality image.

In an embodiment, the display device displays the obstacle as a silhouette.

In an embodiment, the display device displays the obstacle more sharply as a distance between the obstacle and the user decreases.

In an embodiment, the HMD further includes a sensor configured to detect a movement of the user.

In an embodiment, the HMD further includes an infrared (IR) marker positioned outside the HMD and configured to measure a movement of the HMD.

According to an aspect of the present invention, there is provided a head-mounted display (HMD) including a virtual reality mask (VR mask) including a camera configured to capture an external image and AR glasses comprising a processor configured to identify an obstacle included in an external image received from the VR mask and a display device configured to display the obstacle together with a virtual reality image.

In an embodiment, the VR mask and the AR glasses are coupled to each other using at least one magnetic base.

In an embodiment, a coupling position of a central magnetic base of the VR mask and a central magnetic base of the AR glasses is fixed, and a coupling position of a side magnetic base of the VR mask and a side magnetic base of the AR glasses is determined according to a width of the AR glasses.

In an embodiment, the VR mask further includes a sensor configured to measure a movement of a user and a graphics processing unit (GPU) configured to process the external image.

In an embodiment, the processor checks a connection between the VR mask and the AR glasses and operates in a VR mode.

According to an aspect of the present invention, there is provided a virtual reality image display method including displaying a virtual reality image to a user, capturing an external image, identifying an obstacle included in the external image, and adjusting the amount of light incident from the outside when the obstacle is identified.

In an embodiment, the adjusting of the amount of light includes adjusting a polarizing plate.

In an embodiment, the adjusting of the amount of light includes determining the amount of light incident from the outside on the basis of a distance between the obstacle and the user and adjusting a polarizing plate according to the determined amount of light.

In an embodiment, the adjusting of the amount of light includes increasing the amount of light incident from the outside as a distance between the obstacle and the user decreases.

According to an aspect of the present invention, there is provided a head-mounted display (HMD) including a display device configured to display a virtual reality image to a user, a camera configured to capture an external image, a processor configured to identify an obstacle included in the external image, and a polarizing plate configured to adjust the amount of light incident from the outside, wherein when the obstacle is identified, the processor controls the polarizing plate to adjust the amount of light incident from the outside.

In an embodiment, the processor determines the amount of light incident from the outside on the basis of a distance between the obstacle and the user and adjusts a polarizing plate according to the determined amount of light.

In an embodiment, the HMD further includes a sensor configured to detect a movement of the user.

In an embodiment, the HMD further includes an infrared (IR) marker positioned outside the HMD and configured to measure a movement of the HMD.

According to an aspect of the present invention, there is provided a head-mounted display (HMD) including a virtual reality mask (VR mask) including a camera configured to capture an external image and a polarizing plate configured to adjust the amount of light incident from the outside and augmented reality glasses (AR glasses) including a display device configured to display a virtual reality image and a processor configured to identify an obstacle included in the external image received from the VR mask and control the polarizing plate.

In an embodiment, the VR mask and the AR glasses are coupled to each other using at least one magnetic base.

In an embodiment, a coupling position of a central magnetic base of the VR mask and a central magnetic base of the AR glasses is fixed, and a coupling position of a side magnetic base of the VR mask and a side magnetic base of the AR glasses is determined according to a width of the AR glasses.

In an embodiment, the VR mask further includes a sensor configured to measure a movement of a user and a graphics processing unit (GPU) configured to process the external image.

In an embodiment, the processor checks a connection between the VR mask and the AR glasses and operates in a VR mode.

According to an aspect of the present invention, there is provided a virtual reality mask (VR mask) includes a camera configured to capture an external image and a polarizing plate configured to adjust the amount of light incident from the outside.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present disclosure will be described in detail to be easily embodied by those skilled in the art with reference to the accompanying drawings. The disclosure may, however, be embodied in many different forms and should not be construed as being limited to the embodiments set forth herein. In the accompanying drawings, portions irrelevant to the description of the present disclosure will be omitted for clarity. Moreover, like reference numerals refer to like elements throughout.

Terms used herein are described as general terms which are widely used at present in consideration of the functions of the present disclosure but may be altered according to the intent of an operator skilled in the art, conventional practice, or introduction of new technology. Therefore, the terms used herein should be defined on the basis of the overall content of the present disclosure instead of simply the names of the terms.

It will be understood that, although the terms first, second, etc. may be used herein to describe various elements, these elements should not be limited by these terms. These terms are only used to distinguish one element from another.

The terms used herein are set forth to describe specific embodiments of the present invention, and are not intended to limit the present disclosure. As used herein, the singular forms "a," "an," and "one" are intended to include the plural forms as well, unless the context clearly indicates otherwise. In this disclosure, when one part (or element, device, etc.) is referred to as being "connected" to another part (or element, device, etc.), it should be understood that the former can be "directly connected" to the latter, or "electrically connected" to the latter via an intervening part (or element, device, etc.). Furthermore, when a part is referred to as "including" elements, it should be understood that it can include only those elements, or other elements as well as those elements unless specifically described otherwise.

The use of the term "the" and similar referents in the context of describing the present disclosure (especially in the context of the following claims) are to be construed as covering both the singular and the plural. Also, the steps of the methods described herein can be performed in any suitable order unless otherwise indicated herein or otherwise clearly contradicted by context. The present disclosure is not limited to the described order of the steps.

The expressions such as "in some embodiments" or "in an embodiment" do not necessarily indicate the same element.

Some embodiments of the present disclosure may be described in terms of functional block components and various processing steps. Some or all of the functional blocks may be realized by various numbers of hardware and/or software components configured to perform specific functions. For example, the functional blocks of the present disclosure may be realized by one or more microprocessors or by circuit elements for perform certain functions. Also, for example, the functional blocks may be implemented with various programming or scripting languages. The functional blocks may be implemented with an algorithm executed by one or more processors. Furthermore, the present disclosure could employ any number of conventional techniques for electronics configuration, signal processing and/or control, data processing, and the like. The terms "mechanism," "element," "means," and "configuration" may be widely used and are not limited to mechanical and physical configurations.

Also, connection lines or connection members between elements shown in the drawings are examples of functional connections and/or physical or circuit connections. In a real device, connections between elements may be represented by various functional, physical, or circuit connections that are replaceable or added.

Hereinafter, the present disclosure will be described in detail with reference to the accompanying drawings.

Figure 1:
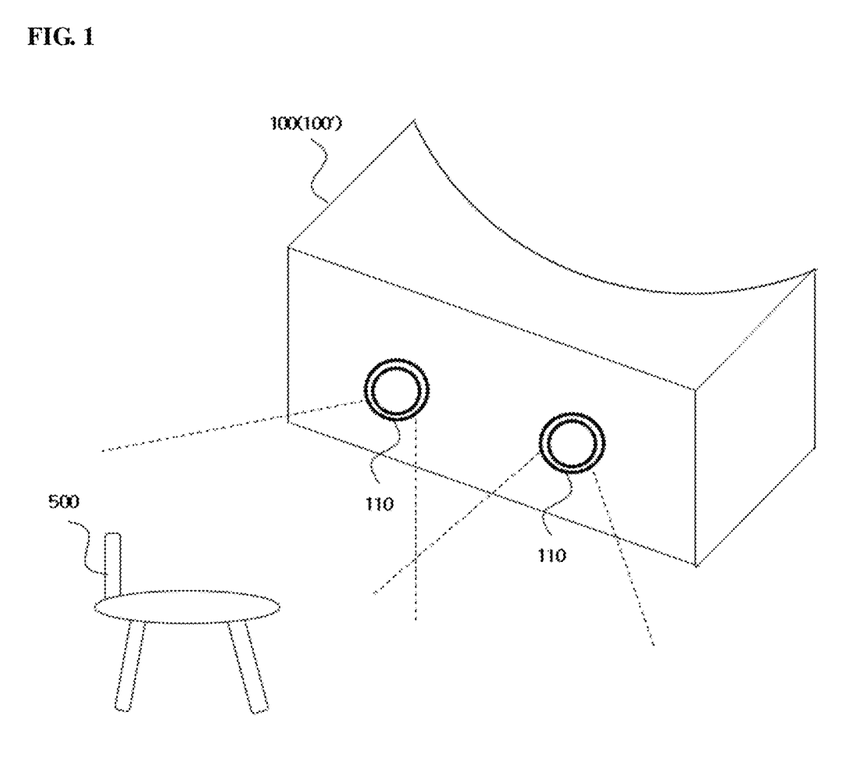
FIG. 1 is a diagram illustrating that an obstacle 500 is positioned near a user who looks at a virtual reality image.

FIG. 1 is a diagram illustrating that an obstacle 500 is positioned near a user who watches a virtual reality image.

A user wears a virtual reality mask (VR mask) 100 and then watches a virtual reality image. When the user wears the VR mask 100, the user cannot discover an obstacle 500 positioned outside the VR mask 100 because the VR mask 100 blocks external light. When the user does not discover the external obstacle 500, the user may collide with the obstacle 500 and may be injured by the obstacle 500.

In order to prevent injury to the user who uses the VR mask 100, it is necessary to make the user recognize the obstacle 500 positioned outside the VR mask 100.

The VR mask 100 includes at least one camera 110, and the camera 110 captures an external image. When the obstacle 500 is detected in the external image captured by the camera 110, a method for the user to discover the obstacle 500 so that the user does not collide with the obstacle 500 is required.

In FIG. 1, an example in which the VR mask 100 includes two cameras 110 has been described, but the VR mask 100 may include one camera 110 or two or more cameras 110.

Figure 2:
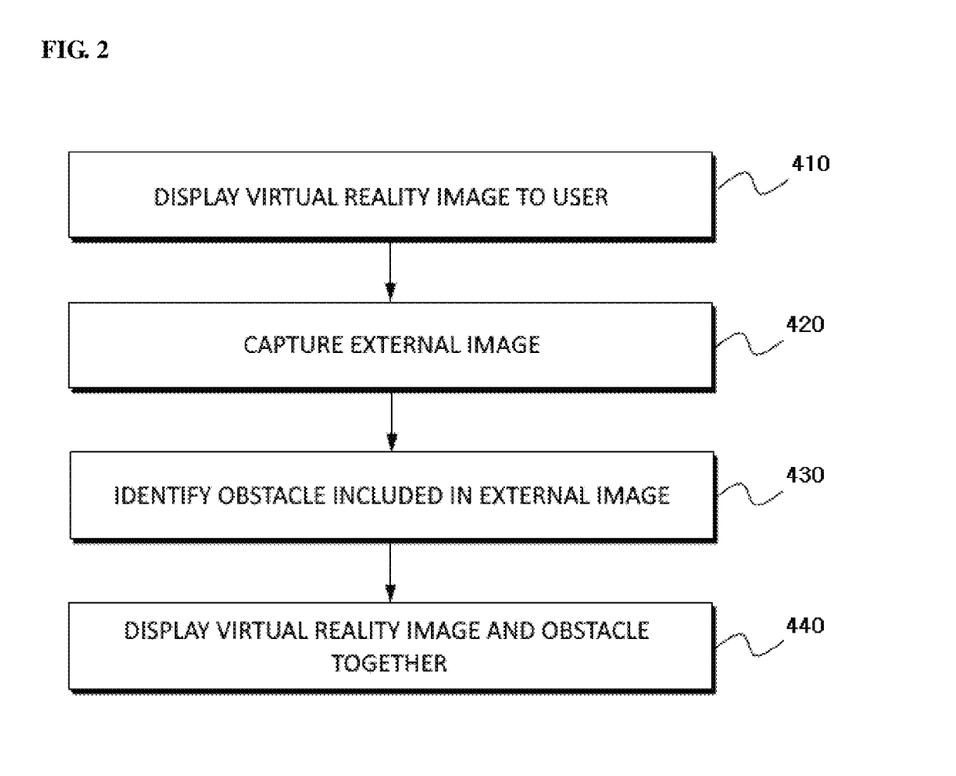
FIG. 2 is a flowchart illustrating a method of displaying a virtual reality image according to a first embodiment.

FIG. 2 is a flowchart illustrating a method of displaying a virtual reality image according to a first embodiment. Referring to FIG. 2, a head-mounted display (HMD) 300 may display a virtual reality image and an obstacle 500 together to prevent collision with the obstacle 500 and the user.

The HMD 300 may be a VR device and may be a coupling of a VR mask 100 and augmented reality (AR) glasses 200. The HMD 300 may be expressed as a virtual reality image display device or the like.

In operation 410, the HMD 300 displays a virtual reality image to a user. The user cannot see the outside while viewing the virtual reality image because external light is blocked by the HMD 300.

In operation 420, the HMD 300 captures an external image. For example, the VR device or the VR mask 100 includes a camera 110, and the camera 110 captures an external image while the user views the virtual reality image. The camera 110 may capture an image in the user's gaze direction.

In operation 430, the HMD 300 identifies an obstacle 500 included in the external image. The HMD 300 analyzes the external image and determines whether the obstacle 500 is included in the external image. When the HMD 300 is a coupling of a VR mask 100 and AR glasses 200, a processor 210 included in the AR glasses 200 may analyze the external image and identify the obstacle 500. As another example, when the VR mask 100 includes a graphics processing unit (GPU), the GPU may analyze the external image and identify the obstacle 500.

In operation 440, the HMD 300 displays a virtual reality image and the obstacle 500 together. As an example, displaying the virtual reality image and the obstacle 500 together may be displaying the obstacle 500 overlapped with the virtual reality image. In order to prevent the user from colliding with the obstacle 500, the HMD 300 may display the virtual reality image and the obstacle 500 together. The user may discover the obstacle and avoid collision with the obstacle 500.

As an example, the HMD 300 may display the obstacle 500 as a silhouette. In other words, the HMD 300 displays the obstacle 500 in a form different from that of the virtual reality image so that the user can distinguish between the virtual reality image and the obstacle 500.

As another example, the HMD 300 may display the obstacle 500 in black and white, as a dotted line, or in a three-dimensional or planar form.

As another example, the HMD 300 may warn the user that the obstacle 500 is approaching by adding a special effect to the obstacle 500. When the user approaches the obstacle 500, the HMD 300 may generate a warning sound or display a warning screen.

As the distance between the obstacle 500 and the user decreases, the HMD 300 may display the obstacle 500 more sharply. For example, when the distance between the obstacle 500 and the user is greater than a reference distance, the HMD 300 displays the obstacle 500 blurrily. When the distance between the obstacle 500 and the user is shorter than a reference distance, the HMD 300 displays the obstacle 500 sharply.

As another example, the HMD 300 may change the size of the obstacle 500 according to the distance between the obstacle 500 and the user. For example, as the distance between the obstacle 500 and the user decreases, the HMD 300 may enlarge and display the obstacle 500.

As another example, when several users use HMDs 300 in one space, a corresponding HMD 300 may calculate the distance between a corresponding user and another user through wireless communication such as Bluetooth and Wi-Fi. When the distance between the corresponding user and the another user is shorter than a reference distance, the HMD 300 may prevent collision between the users by displaying a virtual reality image and an image representing the another user together.

Figure 3:
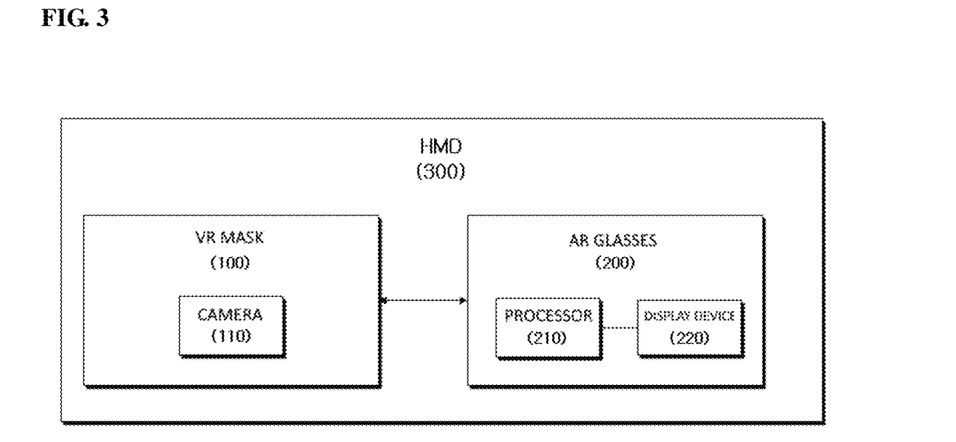
FIG. 3 is a block diagram illustrating a VR mask 100 and AR glasses 200 according to the first embodiment.

FIG. 3 is a block diagram illustrating a VR mask 100 and AR glasses 200 according to the first embodiment. FIG. 3 shows that an HMD 300 is a coupling of the VR mask 100 and the AR glasses 200.

The VR mask 100 includes a camera 110. The VR mask 100 may further include a sensor, a GPU, an infrared (IR) marker 190, and the like.

The camera 110 captures an external image, and the captured external image is sent to the AR glasses 200. A processor 210 of the AR glasses 200 may analyze a received external image and identify an obstacle 500.

The sensor may include an inertial measurement unit (IMU), a Global Positioning System (GPS) unit, etc. The sensor may detect a user's movement, location, and the like. User information detected by the sensor is sent to the AR glasses 200. The processor 210 may analyze the possibility of collision between the user and the obstacle 500 through the user information.

When the VR mask 100 includes a GPU, the AR glasses 200 may operate in the VR mode. The GPU may process and analyze an external image, and the processor 210 may process data other than images, thus increasing the efficiency of the data processing.

The processor 210 may identify the obstacle 500 using an external image received from the VR mask 100 or may determine an image to be displayed to the user. When the possibility of collision between the user and the obstacle 500 increases, the processor 210 may control the display device 220 such that the display device 220 displays the obstacle 500 to the user together with a virtual reality image. The processor 210 may be expressed as a central processing unit (CPU), a core, a control device, or a data processing device.

The display device 220 displays the virtual reality image and the obstacle 500 to the user under the control of the processor 210. The display device 220 may display the obstacle 500 as a silhouette. Also, the display device 220 may display the obstacle 500 in black and white, as a dotted line, or in a three-dimensional or planar form.

Figure 4:
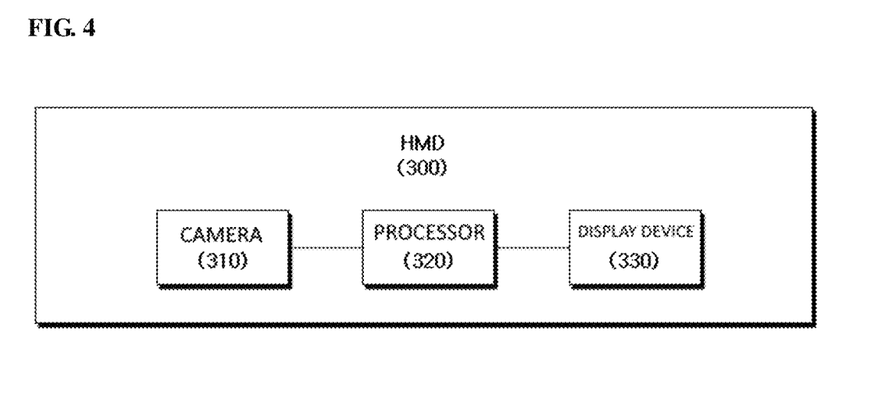
FIG. 4 is a block diagram illustrating an HMD 300 having another form of the first embodiment.

FIG. 4 is a block diagram illustrating an HMD 300 having another form of the first embodiment. FIG. 4 illustrates that the HMD 300 is implemented as one device.

The HMD 300 includes a camera 310, a processor 320, a display device 330, etc. The HMD 300 may further include a GPU, a battery, and a head strap.

The camera 310 captures an external image. The sensor measures the movement of a user who is moving while wearing the HMD 300. The processor 320 processes the external image and controls the display device 330 and the like. The display device 330 displays the virtual reality image and the obstacle 500 to the user. The above description with reference to FIG. 3 is equally applied to the HMD 300 of FIG. 4.

Figure 5:
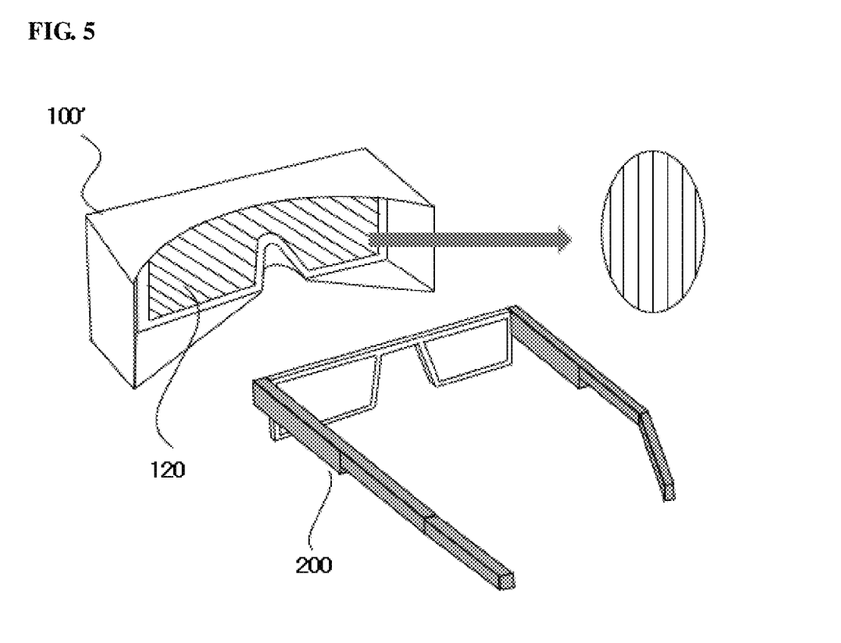
FIG. 5 is a diagram illustrating a polarizing plate 120 of another VR mask 100' according to a second embodiment.

FIG. 5 is a diagram illustrating a polarizing plate 120 of another VR mask 100' according to a second embodiment. The VR mask 100' includes the polarizing plate 120.

The polarizing plate 120 adjusts the amount of light incident from the outside through transmission or blocking by a window. When the polarizing plate 120 is closed, light incident from the outside is blocked so that the user who wears the VR mask 100' cannot see the outside. When the polarizing plate 120 is opened, light incident from the outside is allowed so that the user who wears the VR mask 100' can see the outside.

When the user who wears the VR mask 100' views a virtual reality image, the user may collide with an external obstacle 500 because the user cannot see the outside. Accordingly, when the external obstacle 500 approaches the user, the polarizing plate 120 is opened so that the user can see and avoid the obstacle 500.

Figure 6:
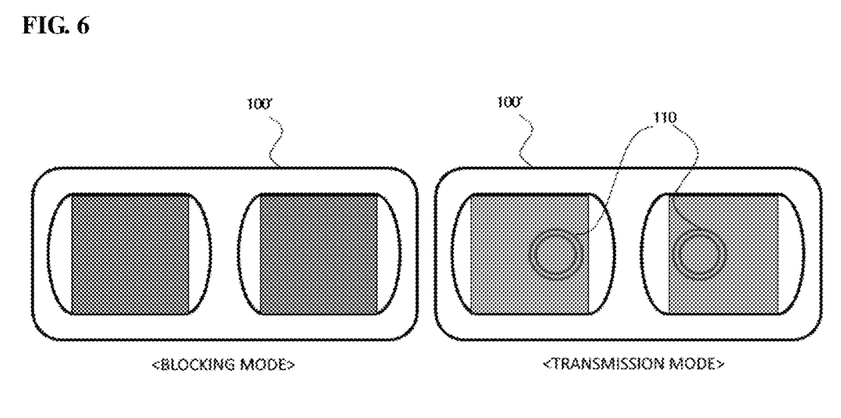
FIG. 6 is a diagram illustrating that the VR mask 100' adjusts the amount of transmitted light.

FIG. 6 is a diagram illustrating that the VR mask 100' adjusts the amount of transmitted light.

In a blocking mode, the polarizing plate 120 is closed so that the user cannot see the outside. The user can see only the virtual reality image.

In a transmission mode, the polarizing plate 120 is opened so that the user can see the outside. The user may see the virtual reality image and the outside together. FIG. 6 shows that in the transmission mode, a camera 110 mounted on the front of the VR mask 100' is visible. In the transmission mode, the user can see the camera 110 and the outside.

Figure 7:
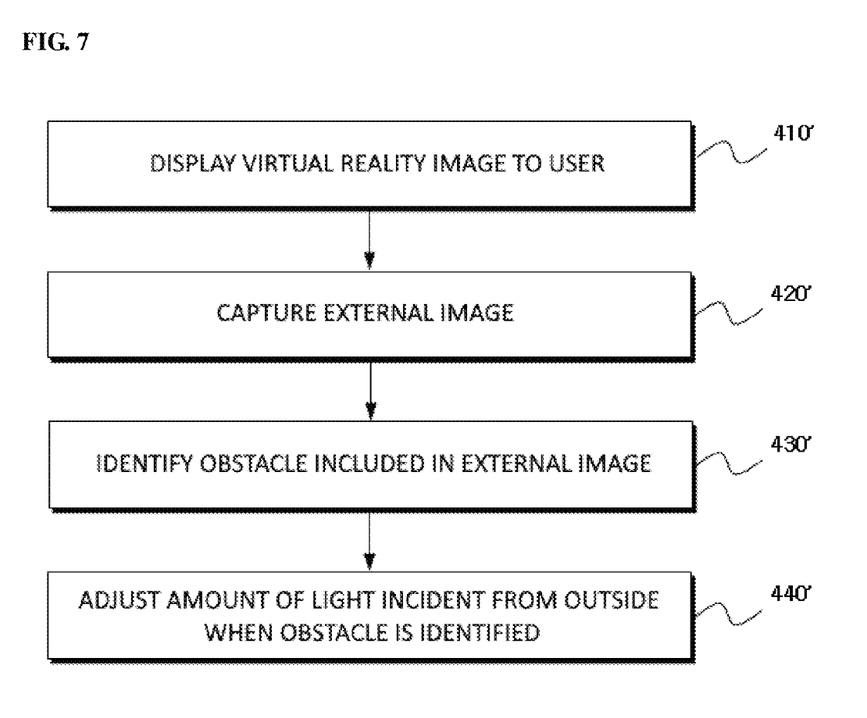
FIG. 7 is a flowchart illustrating a method of displaying a virtual reality image according to the second embodiment.

FIG. 7 is a flowchart illustrating a method of displaying a virtual reality image according to the second embodiment. Referring to FIG. 7, an HMD 300' may adjust the amount of light incident from the outside in order to prevent collision between an obstacle 500 and a user. When light is incident from the outside, a user who wears the HMD 300' can see the outside.

In operation 410', the HMD 300' displays a virtual reality image to a user. The user cannot see the outside while viewing the virtual reality image. When there is no obstacle 500 outside, the polarizing plate 120 is closed, and the user views only the virtual reality image. As an example, the HMD 300' may be a VR device and may be a coupling of a VR mask 100' and AR glasses 200. The HMD 300' may be expressed as a virtual reality image display device or the like.

In operation 420', the HMD 300' captures an external image. For example, the VR device or the VR mask 100' includes a camera 110, and the camera 110 captures an external image while the user views the virtual reality image.

In operation 430', the HMD 300' identifies an obstacle 500 included in the external image. The HMD 300' analyzes the external image and determines whether the obstacle 500 is included in the external image. When the HMD 300' is a coupling of a VR mask 100' and AR glasses 200, a processor 210 included in the AR glasses 200 may analyze the external image and identify the obstacle 500. Also, when the VR mask 100' includes a GPU, the GPU may analyze the external image and identify the obstacle 500.

In operation 440', when the obstacle 500 is identified, the HMD 300' adjusts the amount of light incident from the outside. When light is incident from the outside, the user can see the outside, and the user may discover the obstacle 500 and avoid collision with the obstacle 500.

As an example, the HMD 300' may adjust light incident from the outside by adjusting the polarizing plate 120. In other words, the polarizing plate 120 may block or pass the light incident from the outside to the HMD 300'

The HMD 300' may adjust the amount of light incident from the outside using the polarizing plate 120. The HMD 300' may determine the amount of light incident from the outside on the basis of a distance between the obstacle 500 and the user and adjust the amount of light passing through the polarizing plate 120 according to the determined amount of light.

In an example, the HMD 300' may increase the amount of light incident from the outside as the distance between the obstacle 500 and the user decreases. As the distance between the obstacle 500 and the user decreases, the possibility of collision between the obstacle 500 and the user may increase. Thus, the HMD 300' allows the user to see the obstacle more clearly by further opening the polarizing plate 120.

As another example, when several users use HMDs 300' in one space, a corresponding HMD 300' may calculate the distance between a corresponding user and another user through wireless communication such as Bluetooth and Wi-Fi. When the distance between the corresponding user and the another user is shorter than a reference distance, the HMD 300' may prevent collision between the users by allowing the corresponding user to see the another user by adjusting the polarizing plate 120.

Figure 8:
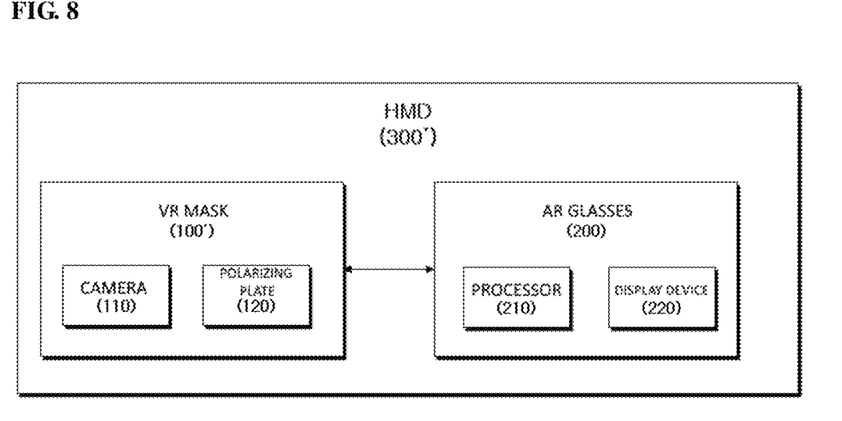
FIG. 8 is a block diagram illustrating a VR mask 100' and AR glasses 200 according to the second embodiment.

FIG. 8 is a block diagram illustrating a VR mask 100' and AR glasses 200 according to the second embodiment. FIG. 8 shows that an HMD 300' is a coupling of the VR mask 100' and the AR glasses 200.

The VR mask 100' includes a camera 110 and a polarizing plate 120. The VR mask 100' may further include a GPU, an IR marker 190, or a sensor.

The camera 110 captures an external image, and the captured external image is sent to the AR glasses 200. A processor 210 of the AR glasses 200 may analyze a received external image and identify an obstacle 500.

The sensor may include an IMU, a GPS unit, etc. The sensor may detect a user's movement, location, and the like. User information detected by the sensor is sent to the AR glasses 200. The processor 210 may analyze the possibility of collision between the user and the obstacle 500 through the user information.

When the VR mask 100' includes a GPU, the AR glasses 200 may operate in the VR mode. The GPU may process and analyze an external image, and the processor 210 may process data other than images, thus increasing the efficiency of the data processing.

The processor 210 may identify the obstacle 500 using an external image received from the VR mask 100' or may determine whether to open the polarizing plate 120. When the possibility of collision between the user and the obstacle 500 increases, the processor 210 may control the polarizing plate 120 such that the user can see external light incident to the VR mask 100'.

The processor 210 may be expressed as a CPU, a core, a control device, or a data processing device.

Figure 9:
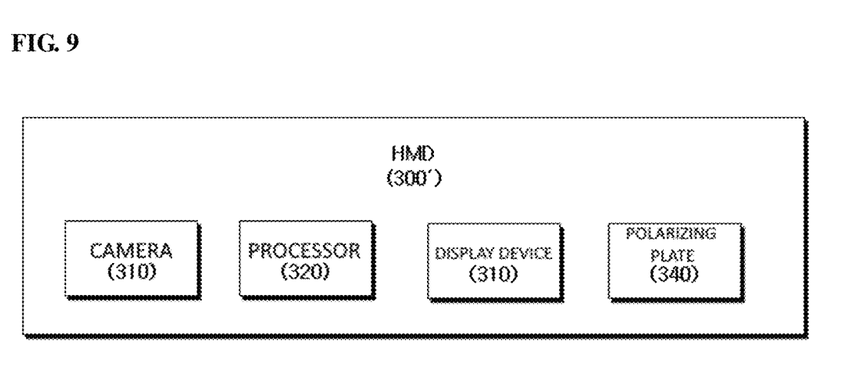
FIG. 9 is a block diagram illustrating an HMD 300' having another form according to the second embodiment.

FIG. 9 is a block diagram illustrating another HMD 300' according to the second embodiment. FIG. 9 illustrates that the HMD 300' is implemented as one device.

The HMD 300' includes a camera 310, a polarizing plate 340, a processor 320, a display device 330, etc. The HMD 300' may further include a GPU, a battery, and a head strap.

The camera 310 captures an external image. The sensor measures the movement of a user who is moving while wearing the HMD 300'. The processor 320 processes the external image and controls the polarizing plate 340, the display device 330, and the like. The display device 330 displays a virtual reality image to the user. The polarizing plate 340 adjusts light incident from the outside. The above description with reference to FIG. 8 is equally applied to the HMD 300' of FIG. 9.

Figure 10:
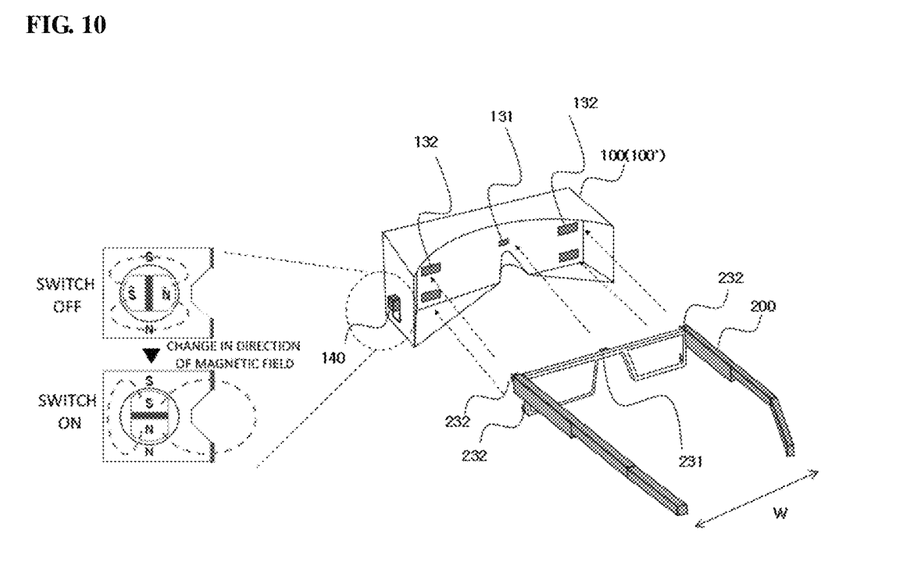
FIG. 10 is a diagram illustrating a method of coupling the AR glasses 200 to the VR mask 100 or 100' according to the first or second embodiment.

FIG. 10 is a diagram illustrating a method of coupling the AR glasses 200 to the VR mask 100 or 100' according to the first or second embodiments.

In an embodiment, the VR mask 100 or 100' may be coupled to the AR glasses 200 using a magnetic base. At least one magnetic base is positioned in corresponding regions of the VR mask 100 or 100' and the AR glasses 200. FIG. 10 shows that five magnetic bases are positioned on the VR mask 100 or 100', but the number of magnetic bases is not limited to five.

The magnetic base is a device of which a magnetic field changes in direction each time a switch is operated. The magnetic base may adjust whether a magnetic force is emitted to the outside by the switch without a need for separate power.

A central magnetic base 131 of the VR mask 100 or 100' and a central magnetic base 231 of the AR glasses 200 are fixed in position. The central magnetic base 131 and the central magnetic base 231 are positioned at a place which is a reference when the VR mask 100 or 100' is coupled to the AR glasses 200.

Side magnetic bases 132 of the VR mask 100 or 100' are positioned on the edges of the VR mask 100 or 100'. FIG. 10 shows that four side magnetic bases 132 are positioned in four places of the VR mask 100 or 100'

A switch 140 of the VR mask 100 or 100' controls the magnetic force of the magnetic bases 131 and 132 included in the VR mask 100 or 100'. The switch 140 may control turning-on or -off of the magnetic bases 131 and 132.

Side magnetic bases 232 of the AR glasses 200 are positioned on the edges of the AR glasses 200. FIG. 10 shows that four side magnetic bases 232 are positioned in four places of the AR glasses 200.

When the VR mask 100 or 100' approaches the AR glasses 200, the magnetic bases 131, 132, 231 and 232 are attracted to each other so that the VR mask 100 or 100' is coupled to the AR glasses 200.

Figure 11:
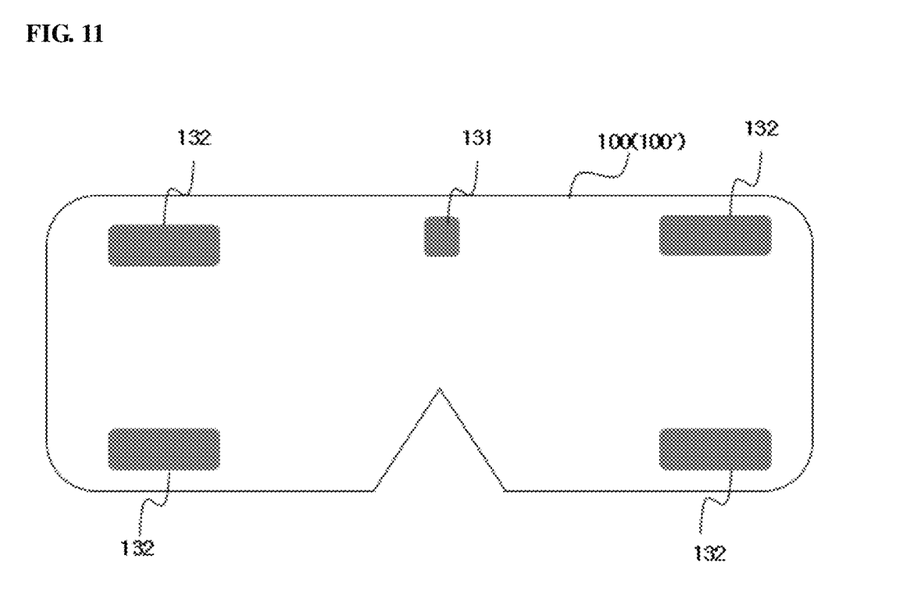
FIG. 11 is a diagram illustrating an example in which magnetic bases are placed in the VR mask 100 or 100' according to the first or second embodiment.

FIG. 11 is a diagram illustrating an example in which magnetic bases are placed in the VR mask 100 or 100' according to the first or second embodiment. FIG. 11 is a front view showing the inside of the VR mask 100 or 100'.

FIG. 11 shows that the length of the side magnetic bases 132 of the VR mask 100 or 100' is greater than the length of the side magnetic bases 232 of the AR glasses 200. The width W of the AR glasses 200 may be adjusted according to a user who wears the AR glasses 200. The length of the side magnetic bases 132 of the VR mask 100 or 100' are determined so that the side magnetic bases 132 of the VR mask 100 or 100' are coupled to the side magnetic bases 232 of the AR glasses 200 even when the width W of the AR glasses 200 are changed. For example, the length of the side magnetic bases 132 of the VR mask 100 or 100' may be equal to the displacement of the width W of the AR glasses 200.

The central magnetic base 131 of the VR mask 100 or 100' and the central magnetic base 231 of the AR glasses 200 have the same length so that the bases can be coupled to each other at the same position. The coupling positions of the side magnetic bases 132 of the VR mask 100 or 100' and the side magnetic bases 232 of the AR glasses 200 are changed according to the width W of the AR glasses. Since the central magnetic base 131 of the VR mask 100 or 100' and the central magnetic base 231 of the AR glasses are coupled to each other at the same position, the coupling positions of the side magnetic bases 132 and 232 are laterally symmetrical even if the coupling positions of the side magnetic bases 132 and 232 are changed.

Figure 12:
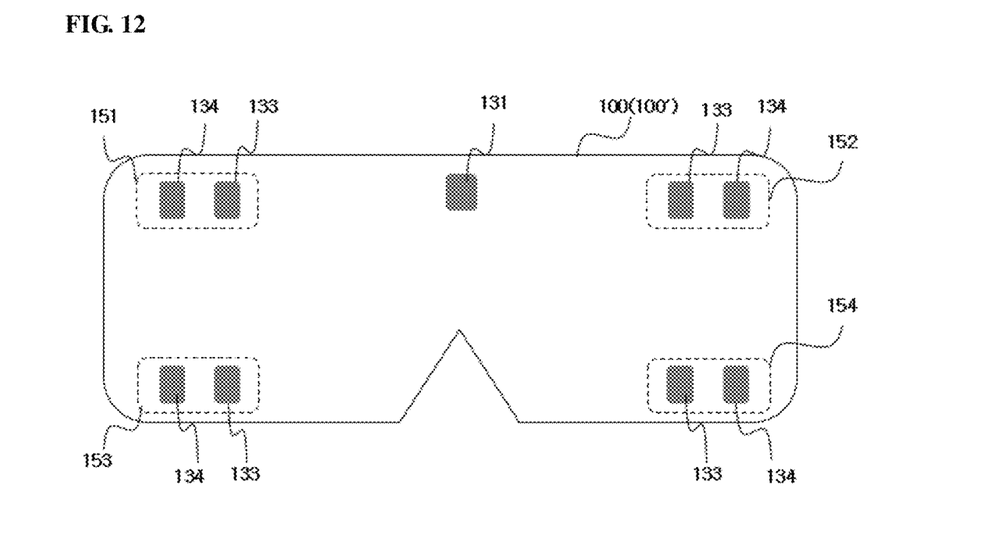
FIG. 12 is a diagram illustrating another example in which magnetic bases are placed in the VR mask 100 or 100' according to the first or second embodiment.

FIG. 12 is a diagram illustrating another example in which magnetic bases are placed in the VR mask 100 or 100' according to the first or second embodiment.

FIG. 12 shows that two or more side magnetic bases 133 and 134 are placed on one side position. For example, two side magnetic bases 133 and 134 are placed on each of first to fourth side positions 151 to 154.

The side magnetic bases 133 and 134 of the VR mask to which the side magnetic bases 232 of the AR glasses 200 are to be coupled are determined according to the width W of the AR glasses 200. For example, when the width W of the AR glasses 200 is reduced, the side magnetic bases 232 of the AR glasses 200 are coupled to four side magnetic bases 133 on an inner side of the VR mask 100 or 100'. When the width W of the AR glasses 200 is increased, the side magnetic bases 232 of the AR glasses 200 are coupled to four side magnetic bases 134 on an outer side of the VR mask 100 or 100'.

FIG. 12 shows an example in which two side magnetic bases 133 and 134 are placed at one side position, but three or more side magnetic bases may be placed at one side position.

Regardless of the width W of the AR glasses 200, the central magnetic base 131 of the VR mask 100 or 100' is coupled to the central magnetic base 231 of the AR glasses 200.

Figure 13:
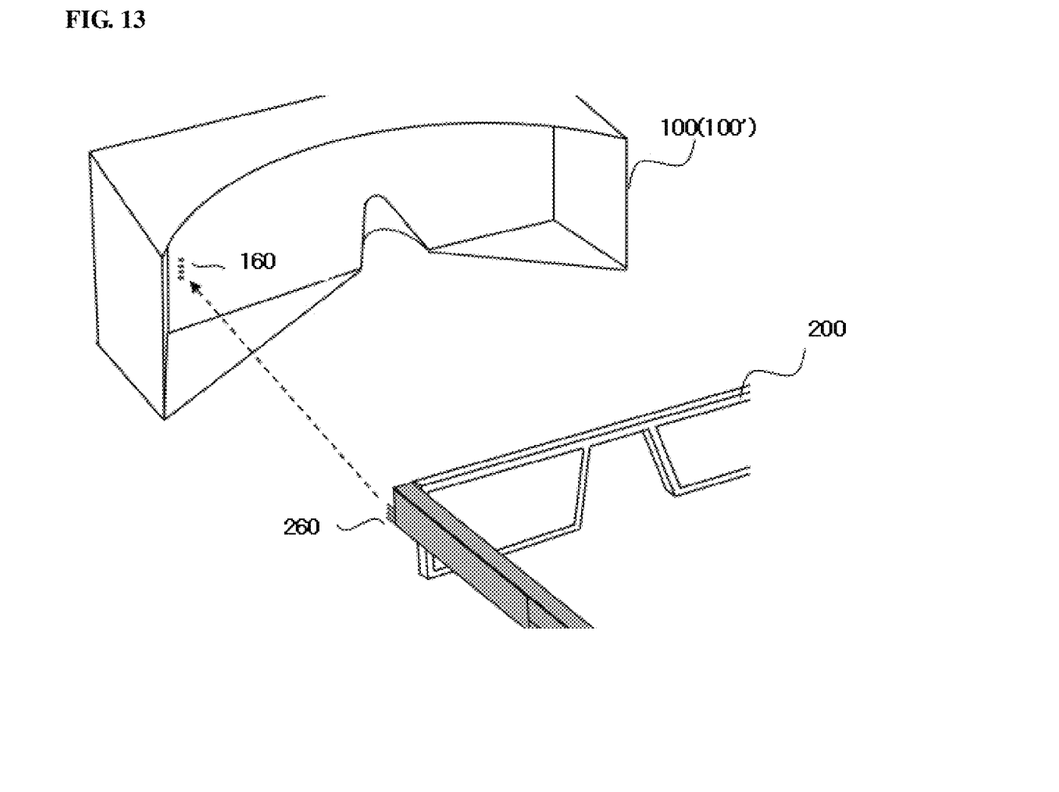
FIG. 13 is a diagram illustrating a method of transmitting and receiving power and data of the AR glasses 200 and the VR mask 100 or 100' according to the first or second embodiment.

FIG. 13 is a diagram illustrating a method of transmitting and receiving power and data of the AR glasses 200 and the VR mask 100 or 100' according to the first or second embodiment.

The VR mask 100 or 100' and the AR glasses 200 may send and receive data and power by wire or wirelessly. When data and power is transmitted or received by wire, the data and power may be transmitted or received through a connection terminal 160 and a connection pin 260 as shown in FIG. 11.

For example, an external image captured by the VR mask 100 or 100' may be sent to the AR glasses 200 through the connection terminal 160 and the connection pin 260. Also, power may be transmitted or received between the AR glasses 200 and the VR mask 100 or 100' through the connection terminal 160 and the connection pin 260. When a battery 183 is mounted on the AR glasses 200, power may be transmitted or received from the AR glasses 200 to the VR mask 100 or 100'.

Figure 14:
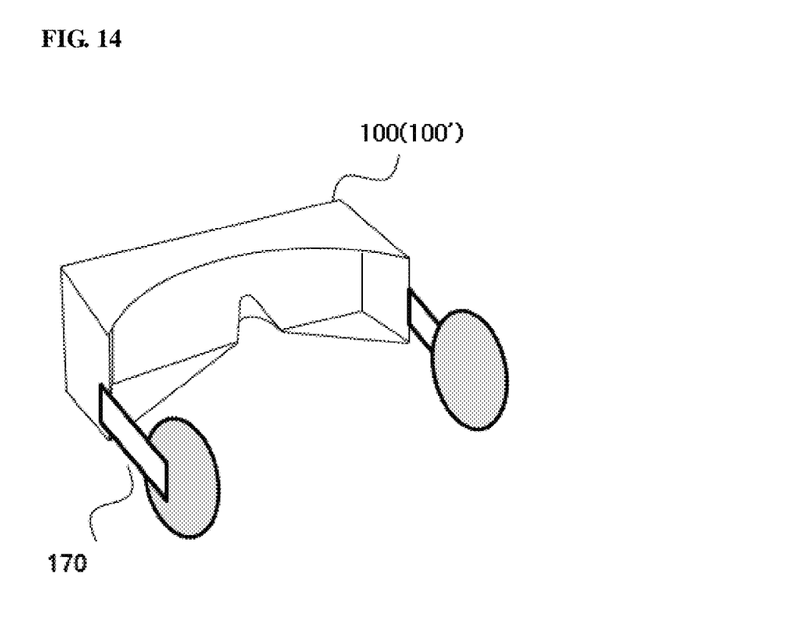
FIG. 14 is a diagram illustrating a coupling of a headset module 170 and the VR mask 100 or 100' according to the first or second embodiment.

FIG. 14 is a diagram illustrating a coupling of a headset module 170 and the VR mask 100 or 100' according to the first or second embodiment.

Since the AR glasses 200 do not include the headset module 170, a user can hear sounds through the headset module 170 when the VR mask 100 or 100' and the AR glasses 200 are coupled to each other. When the user approaches the obstacle 500, the AR glasses 200 may generate a warning sound through the headset module 170 to warn the user.

Figure 15:
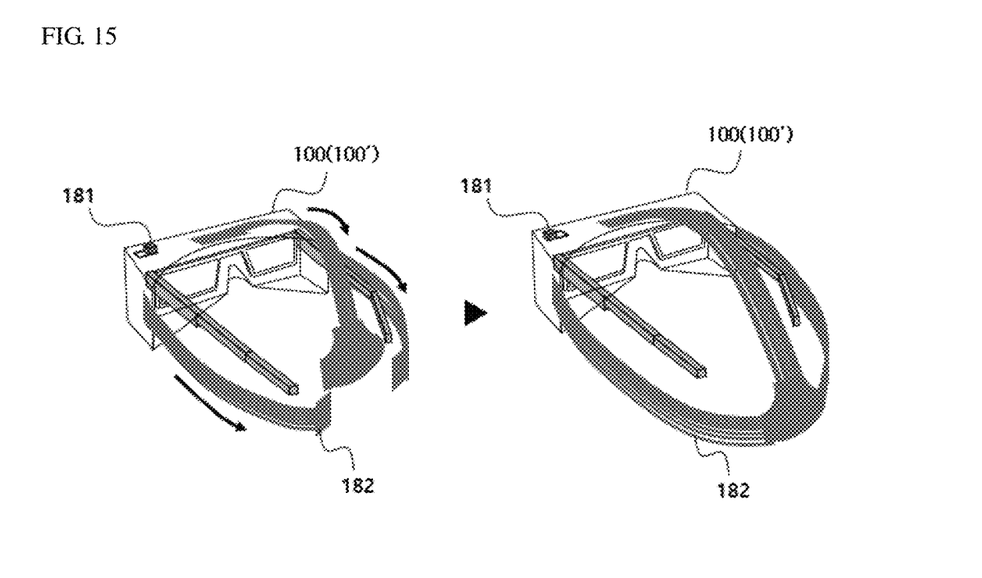
FIG. 15 is a diagram illustrating a coupling of a head strap 182 and the VR mask 100 or 100' according to the first or second embodiment.

FIG. 15 is a diagram illustrating a coupling of a head strap 182 and the VR mask 100 or 100' according to the first or second embodiment.

When the VR mask 100 or 100' is coupled to the AR glasses, the head strap 182 for supporting the VR mask 100 or 100' may be mounted on the VR mask 100 or 100'. The head strap 182 may be in the form of wrapping the user's head in three directions.

In FIG. 15, the left figure shows that a switch 181 is on before the head strap 182 is fixed, and the right figure shows that the switch 181 is off after the head strap 182 is fixed.

The length of the head strap 182 may be adjusted in various ways. As shown in FIG. 15, the length of the head strap 182 may be adjusted using the switch 181.

As another example, the length of the head strap 182 may be adjusted using a Velcro fastener 184.

As another example, the length of the head strap 182 may be adjusted by increasing the length of the head strap 182 when the head strap 182 is pulled once and by reducing the length of the head strap 182 by pulling the head strap 182 once more.

Figure 16:
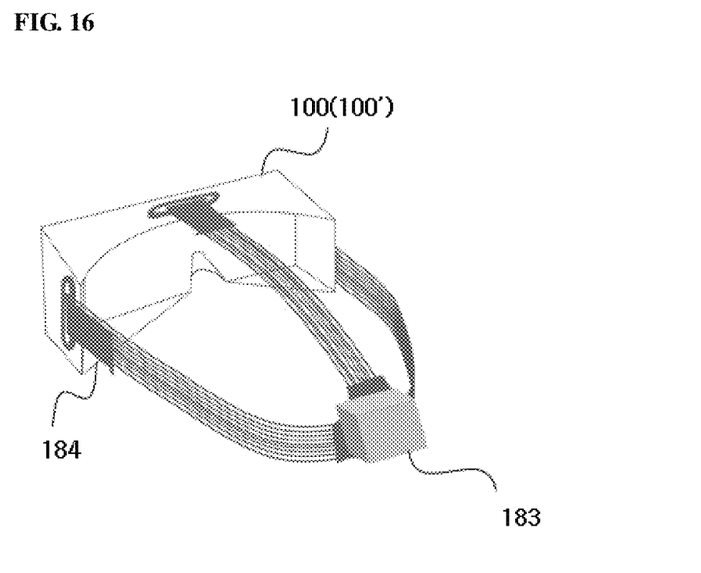
FIG. 16 is a diagram illustrating a coupling of a battery 183 and the VR mask 100 or 100' according to the first or second embodiment.

FIG. 16 is a diagram illustrating a coupling of a battery 183 and the VR mask 100 or 100' according to the first or second embodiment. In consideration of the weight of the battery 183, the battery 183 may be placed behind the user's head. Also, the battery 183 may be placed at a position where three head straps 182 cross each other.

In the VR mode, the HMD 300 consumes a large amount of power. Accordingly, when the battery 183 is mounted on the HMD 300, the user can use the HMD 300 for a long time.

Figure 17:
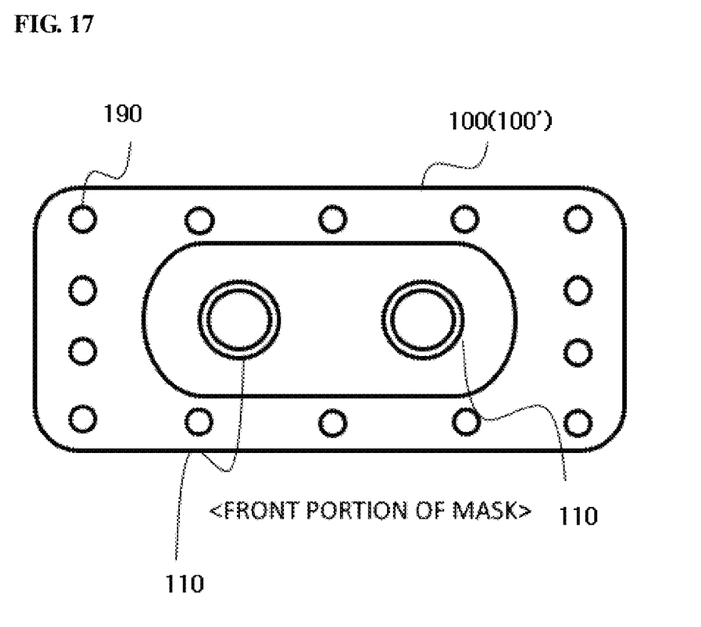
FIG. 17 is a diagram illustrating an IR marker 190 attached to the VR mask 100 or 100' according to the first or second embodiment.

FIG. 17 is a diagram illustrating an IR marker 190 attached to the VR mask 100 or 100' according to the first or second embodiment. The IR marker 190 may be of a self-luminescence type or a reflective luminescence type.

The self-luminescence type IR marker 190 is used without additional external IR illumination. Different users may be identified through various luminescence patterns. The self-luminescence type IR marker 190 is covered by the front portion of the mask and cannot be visually identified.

The reflective luminescence type IR marker 190 requires additional external IR illumination. The reflective luminescence type IR marker 190 is visually identified.

The foregoing description is only a preferred embodiment of the present disclosure and is not used to limit the scope of the present disclosure. Those skilled in the art can make changes and modifications within the scope without departing from the spirit of the present disclosure, and therefore should be dealt with within the scope described in the appended claims.

What is claimed is:

1. A head-mounted display (HMD) comprising:
    a virtual reality mask (VR mask) comprising a camera configured to capture an external image and a polarizing plate configured to adjust the amount of light incident from outside; and
    augmented reality glasses (AR glasses) comprising a display device configured to display a virtual reality image and a processor configured to identify an obstacle included in the external image received from the VR mask and control the polarizing plate;
    wherein the processor determines the amount of light incident from the outside on the basis of a distance between the obstacle and a user and adjusts the polarizing plate according to the determined amount of light; and
    wherein
    a coupling position of a central magnetic base of the VR mask and a central magnetic base of the AR glasses is fixed, and
    a coupling position of a side magnetic bass of the VR mask and a side magnetic base of the AR glasses is determined according to a width of the AR glasses.

2. The HMD of claim 1, further comprising a sensor configured to measure a movement of a user and a graphics processing unit (GPU) configured to process the external image.

3. The HMD of claim 1, wherein the processor checks a connection between the VR mask and the AR glasses and operates in a VR mode.

* * * * *